US008624988B2

(12) United States Patent
Suzuki et al.

(10) Patent No.: US 8,624,988 B2
(45) Date of Patent: Jan. 7, 2014

(54) IMAGE PICKUP APPARATUS, IMAGE PICKUP METHOD, AND PROGRAM THEREOF

(75) Inventors: Yasufumi Suzuki, Tokyo (JP); Hiroshi Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 894 days.

(21) Appl. No.: 12/123,201

(22) Filed: May 19, 2008

(65) Prior Publication Data

US 2009/0002512 A1    Jan. 1, 2009

(30) Foreign Application Priority Data

Jun. 28, 2007  (JP) ................................. 2007-171249

(51) Int. Cl.
   *H04N 5/228*   (2006.01)
   *G06K 9/00*    (2006.01)
   *G03B 17/00*   (2006.01)

(52) U.S. Cl.
   USPC ..................... 348/222.1; 382/118; 396/263

(58) Field of Classification Search
   USPC ................ 348/778, 143, 211.4, 211.5, 211.6,
      348/220.1, 222.1, 231.99, 231.2, 231.3,
      348/333.02, 333.03; 382/118, 190;
      396/263, 264
   See application file for complete search history.

(56) References Cited

U.S. PATENT DOCUMENTS

| 7,248,300 | B1 * | 7/2007 | Ono .......................... 348/333.03 |
| 7,574,128 | B2 * | 8/2009 | Matsuda ....................... 396/264 |
| 7,630,015 | B2 * | 12/2009 | Okamura ...................... 348/371 |
| 2007/0025722 | A1 * | 2/2007 | Matsugu et al. .............. 396/263 |

FOREIGN PATENT DOCUMENTS

| CN | 1905629 A | 1/2007 |
| JP | 2000-347277 | 12/2000 |
| JP | 2000-347278 | 12/2000 |
| JP | 2003-92701 | 3/2003 |
| JP | 2004-294498 | 10/2004 |
| JP | 2006-237803 | 9/2006 |
| JP | 2007-67560 | 3/2007 |
| JP | 2007-104235 | 4/2007 |

OTHER PUBLICATIONS

U.S. Appl. No. 12/601,838, filed Nov. 25, 2009, Suzuki, et al.
U.S. Appl. No. 12/100,516, filed Apr. 10, 2008, Abe.
U.S. Appl. No. 12/107,314, filed Apr. 22, 2008, Abe.
U.S. Appl. No. 12/126,401, filed May 23, 2008, Abe.
Office Action issued Jul. 14, 2011 in Japanese Patent Application No. 2007-171249.

* cited by examiner

*Primary Examiner* — Lin Ye
*Assistant Examiner* — Peter Chon
(74) *Attorney, Agent, or Firm* — Oblon, Spivak, McClelland, Maier & Neustadt, L.L.P.

(57) ABSTRACT

An image pickup apparatus includes an image pickup unit configured to pick up a subject image and a control unit configured to perform control in a manner such that, in a case in which a predetermined mode is set, smile detection of a subject is started when an operation input is performed, the subject image is picked up if a smile is detected, and smile detection and image pickup are repeatedly performed until a completion condition is satisfied.

19 Claims, 6 Drawing Sheets

IMAGE PICKUP APPARATUS, IMAGE PICKUP METHOD, AND PROGRAM THEREOF

CROSS REFERENCES TO RELATED APPLICATIONS

The present invention contains subject matter related to Japanese Patent Application JP 2007-171249 filed in the Japanese Patent Office on Jun. 28, 2007, the entire contents of which are incorporated herein by reference.

BACKGROUND OF THE INVENTION

1. Field of the Invention

The present invention relates to an image pickup apparatus such as, for example, a digital still camera. The present invention relates more particularly to an image pickup apparatus, an image pickup method, and a program thereof that detect, in particular, a smile of a subject and appropriately perform auto focus (AF), auto exposure (AE), auto white balance (AWB), and the like.

2. Description of the Related Art

Image pickup apparatuses such as digital still cameras and digital video cameras have an AF function. This AF function is used to perform automatic focusing on a subject. In general, an image pickup element such as a charge-coupled device (CCD) or a complementary metal oxide semiconductor (CMOS) is used to pickup a subject image, and a focus position is often automatically determined on the basis of the contrast of a picked-up image. These days, spot AF can be performed. Spot AF allows an AF point to be appropriately set in an AF detectable frame so that a position that a user desires is focused on in an image to be picked up. If an image pickup mode is set as spot AF, a user performs a usual image pickup operation after an AF point which the user desires is selected in an AF detectable frame and the AF point is set on a screen by means of an operation input.

Moreover, whether a face of a subject is positioned at an AF point which is set in the AF detectable frame can be detected these days. That is, so-called face detection can be performed.

For this type of technology, for example, Japanese Unexamined Patent Application Publication No. 2007-104235 discloses an image pickup apparatus that realizes high-quality image pickup by performing image pickup control which is caused to adapt to a specific image pickup subject. With this technology, for example, in an image pickup apparatus that executes image pickup control which has been adapted to a specific image pickup subject such as a face of a person, in a case in which a shielding object such as a wall causes the image pickup subject to temporarily disappear from an image to be picked up, image control adapted to a specific image pickup subject such as the face of the person is continuously performed.

Moreover, technical research is being performed with respect to an image pickup apparatus that detects not only a face of a subject but also a smile thereof. In this case, smile detection is performed, for example, on the basis of whether a main part of a subject satisfies a predetermined condition.

With respect to image pickup with smile detection, it is necessary to instantly perform picking up of an image at a time when a smile is detected in order not to miss picking up the smile occurring for just a moment. However, no proposals have been specifically made for appropriate control of a timing of the start/end of image pickup.

SUMMARY OF THE INVENTION

With respect to image pickup with smile detection of a subject, it is desirable to obtain a high-quality image by appropriately controlling a timing of the start/end of smile detection of the subject.

According to an embodiment of the present invention, an image pickup apparatus includes image pickup means for picking up a subject image, and control means for performing control in a manner such that, in a case in which a predetermined mode is set, smile detection of a subject is started when an operation input is performed, the subject image is picked up if a smile is detected, and smile detection and image pickup are repeatedly performed until a completion condition is satisfied.

In the image pickup apparatus, the completion condition may be the operation input.

In the image pickup apparatus, the completion condition may be reaching of a maximum number of shots that can be taken.

In the image pickup apparatus, the completion condition may be a lapse of a predetermined period of time from when the operation input is performed.

In the image pickup apparatus, the control means may perform image pickup control between the smile detection and the image pickup.

According to another embodiment of the present invention, an image pickup method includes the steps of detecting a smile of a subject when an operation input is performed in a case in which a predetermined mode is set and picking up a subject image if a smile is detected. In the image pickup method, the step of detecting and the step of picking up are repeated until a completion condition is satisfied.

The image pickup method may further include the step of performing image pickup control between the step of detecting and the step of picking up.

According to another embodiment of the present invention, a program executed by a computer, the program causing the computer to perform an image pickup method, the image pickup method includes the steps of detecting a smile of a subject when an operation input is performed in a case in which a predetermined mode is set and picking up a subject image if a smile is detected. In the image pickup method, the step of detecting and the step of picking up are repeated until a completion condition is satisfied.

In the program, the image pickup method may further include the step of performing image pickup control between the step of detecting and the step of picking up.

According to another embodiment of the present invention, an image pickup apparatus includes an image pickup unit configured to pick up a subject image, and a control unit configured to perform control in a manner such that, in a case in which a predetermined mode is set, smile detection of a subject is started when an operation input is performed, the subject image is picked up if a smile is detected, and smile detection and image pickup are repeatedly performed until a completion condition is satisfied.

DESCRIPTION OF THE PREFERRED EMBODIMENTS

Preferred embodiments (hereinafter simply referred to as "embodiments") according to the present invention will be described below with reference to the attached drawings. In image pickup with smile detection, an image pickup apparatus according to a first embodiment of the present invention appropriately controls a timing of the start/end of the image pickup. The timing of the end of the image pickup is controlled on the basis of, for example, a maximum-number-of-shots limitation, a shutter-button operation, and a time limitation.

Figure 1:
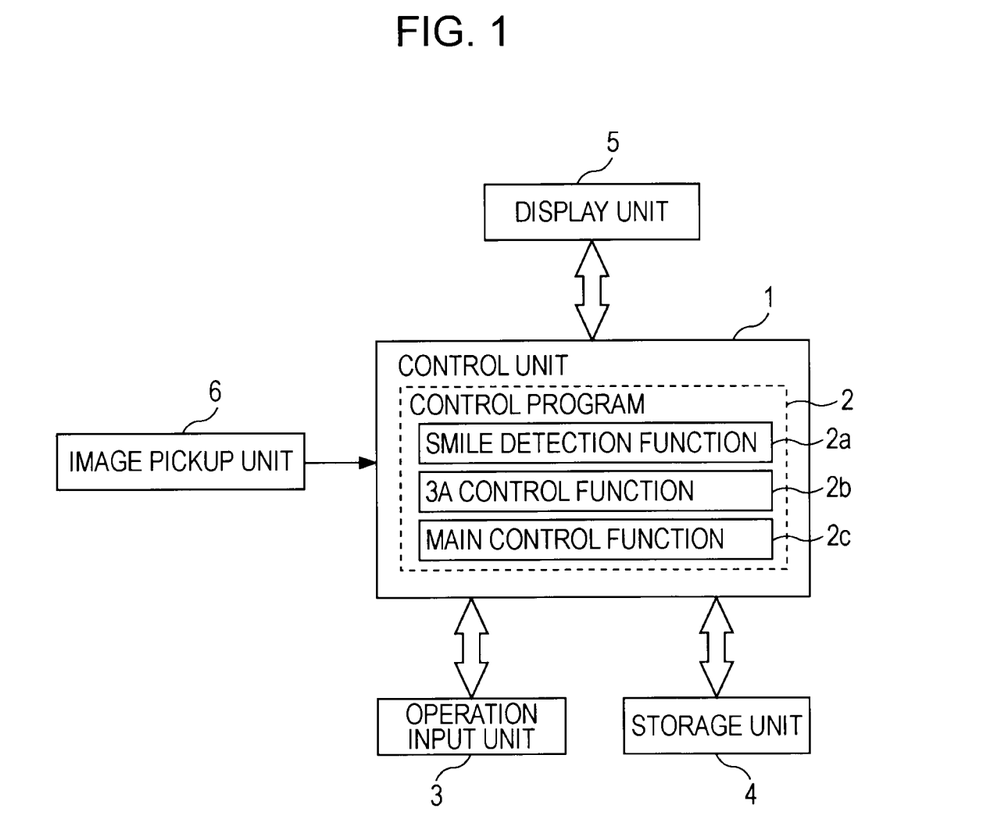
FIG. 1 is a schematic diagram of an image pickup apparatus according to a first embodiment of the present invention.

FIG. 1 is a schematic diagram showing a structure of an image pickup apparatus according to the first embodiment of the present invention.

As shown in FIG. 1, the image pickup apparatus according to the first embodiment includes a control unit 1 which controls the entirety of the image pickup apparatus, an operation input unit 3, a storage unit 4, a display unit 5, and an image pickup unit 6.

The control unit 1 provides a smile detection function 2a, a 3A control function 2b, and a main control function 2c by reading a control program 2 stored in the storage unit 4 and executing the control program 2.

Figure 2:
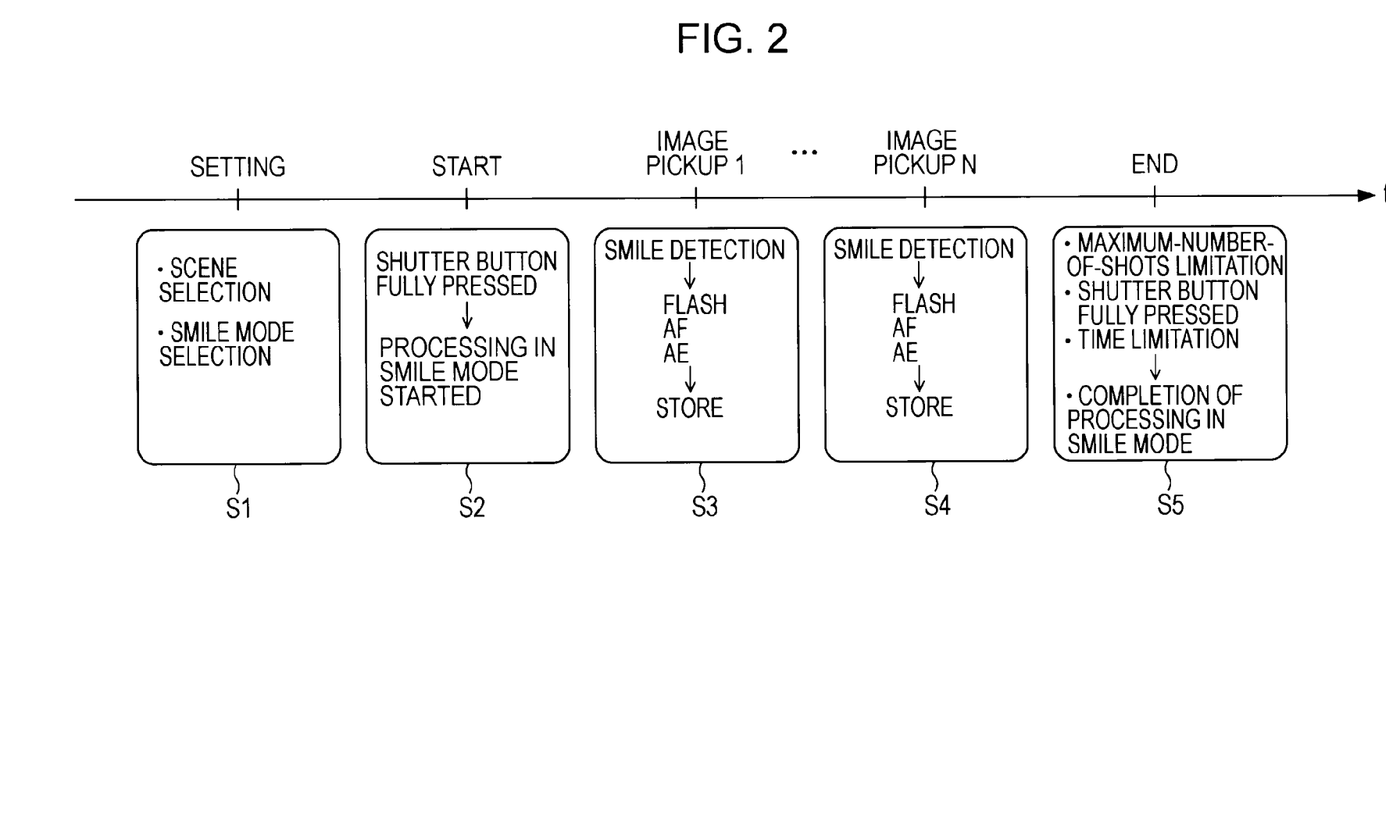
FIG. 2 is a sequence diagram used to describe, in more detail, characteristic processing according to the image pickup apparatus according to the first embodiment of the present invention.

The operation of each component will be described below with reference to a sequence diagram shown in FIG. 2.

First, by means of the main control function 2c, the control unit 1 displays a through-the-lens image on the display unit 5, allows a user to perform scene selection, and accepts smile mode selection.

Here, the "smile mode" is a mode in which image pickup with smile detection for a subject (hereinafter simply referred to as "smile detection") is executed.

In this way, in step S1, when an image pickup scene and a smile mode are selected by a user, the control unit 1 performs setting by means of the main control function 2c according to these selections.

In step S2, when a shutter button included in the operation input unit 3 is fully pressed by the user, the control unit 1 detects a signal released by the shutter button, and starts image pickup (processing) in the smile mode by means of the smile detection function 2a. After step S2, until a completion condition described below is satisfied, smile detection processing, image-pickup control processing, image-pickup processing, and image storage processing are repeatedly performed as processing of each of image pickup 1 through image pickup n by means of the 3A control function 2b in steps S3 and S4.

Here, this "smile detection" is performed, with respect to a main part of a main subject of an image to be picked up, on the basis of whether the main part satisfies a predetermined condition. More specifically, for the subject, such smile detection is performed on the basis of, for example, a size (an area) of the white of an eye or a size (an area) of a white portion in the mouth. However, such smile detection is not limited to these methods.

In this way, if one of the completion conditions described below is satisfied, the image pickup (processing) in the smile mode is completed in step S5.

That is, in the image pickup apparatus according to the first embodiment, if any one of the following conditions is satisfied, maximum-number-of-shots limitation (for example, steps S3 and S4 are repeatedly executed until the number of shots reaches a predetermined number, and then pickup (processing) is completed.)

shutter button fully pressed (pickup (processing) is completed at a timing of a shutter button being fully pressed.)

time limitation (if a time measured by a timer exceeds a predetermined period of time, pickup (processing) is completed.)

the control unit 1 is designed to complete image pickup (processing) in the smile mode by means of the main control function 2c. These conditions may be prioritized or other completion conditions may be added, as a matter of course.

Here, in order to execute the "smile mode", it is necessary to first perform "face detection" of a subject. As a method thereof, an existing method such as a method in which a template of an average face image is prepared in advance and matching between an input image and an image of the template is performed can be utilized. Thus, a detailed description of such face detection is omitted.

In this way, in image pickup with smile detection of a subject, the image pickup apparatus according to the first embodiment of the present invention can be used to obtain a high-quality image since the control unit 1 appropriately controls a timing of the start/end of the image pickup by means of the main control function 2c.

Next, a second embodiment of the present invention will be described.

Figure 3:
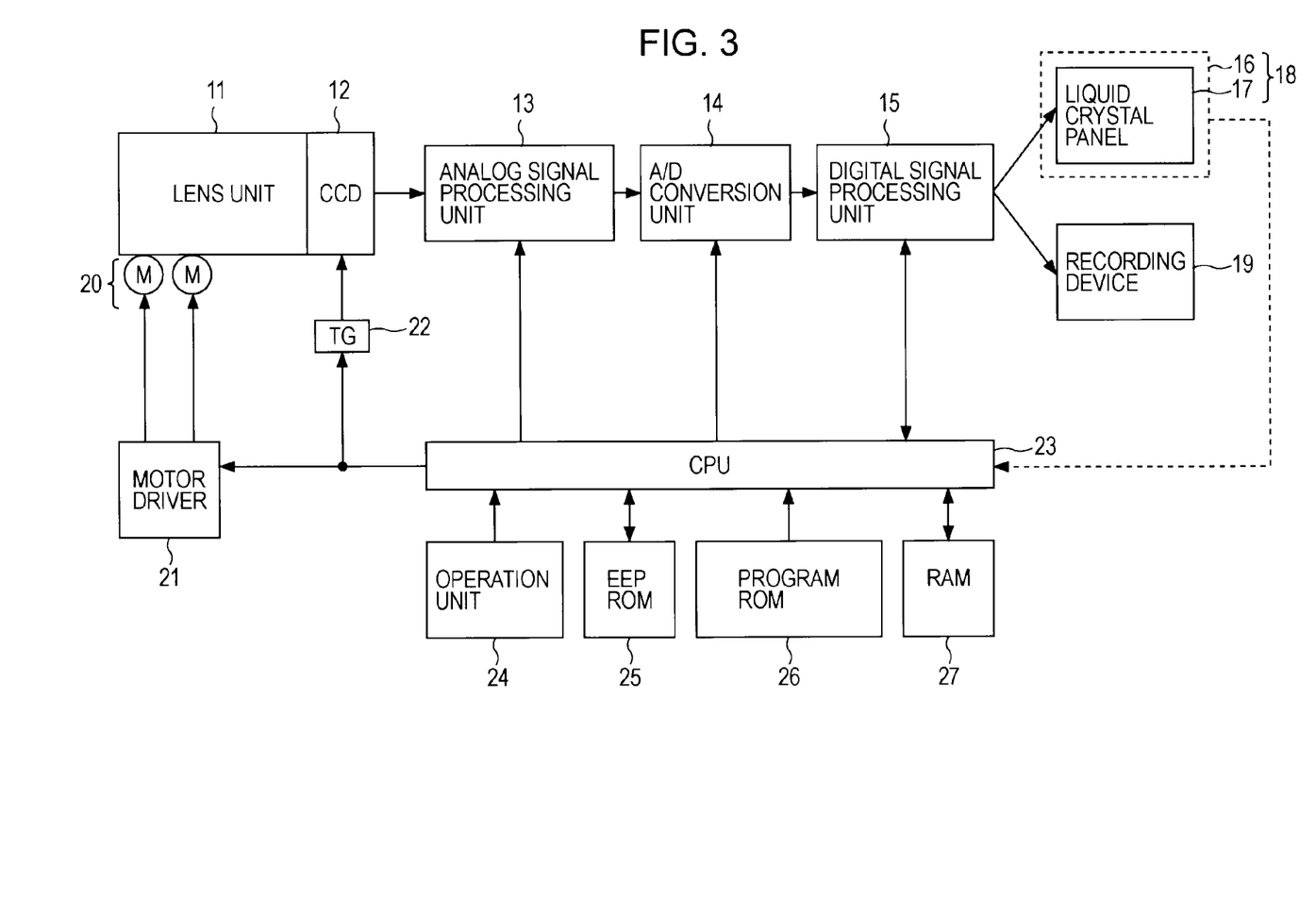
FIG. 3 is a block diagram of a structure of an image pickup apparatus according to a second embodiment of the present invention.

FIG. 3 is a block diagram showing a structure of an image pickup apparatus according to the second embodiment of the present invention.

This shows the image pickup apparatus according to the first embodiment described above in more detail.

As shown in FIG. 3, a lens unit 11 which includes, as components thereof, a shooting lens, an aperture, a focus lens, and the like is provided in the image pickup apparatus according to the second embodiment. An image pickup device 12 such as a CCD is disposed in an optical path of subject-image light entering via the lens unit 11. The image pickup device 12, an analog signal processing unit 13, an analog-to-digital (A/D) conversion unit 14, and a digital signal processing unit 15 are connected in series. An output of the digital signal processing unit 15 is electrically connected to an input of a liquid crystal panel 17 and to an input of a recording device 19.

An actuator 20 that adjusts the size of the aperture or moves the focus lens is mechanically connected to the lens unit 11, the aperture and the focus lens being included in the lens unit 11. The actuator 20 is connected to a motor driver 21 that performs drive control of the actuator 20.

Moreover, a central processing unit (CPU) 23 that controls the entirety of the image pickup apparatus is provided therein. The CPU 23 is connected to the motor driver 21, a timing generator (TG) 22, an operation unit 24, an electrically erasable programmable read-only memory (EEPROM) 25, a program ROM 26, a random access memory (RAM) 27, and a touch panel 16. The CPU 23 executes, for example, a control function, in particular, a smile detection function, an image-pickup control function, and a main control function by reading out and executing the control program stored in the program ROM 26.

The touch panel 16 and the liquid crystal panel 17 constitute a touch screen 18.

The recording device 19 may be, for example, a disc such as a digital versatile disc (DVD), a semiconductor memory such as a memory card, or a removable recording medium other than those mentioned earlier. The recording device 19 is removable from the body of the image pickup apparatus. The EEPROM 25 stores, for example, various data on the settings and other data that are necessary to be stored while the power is off. The program ROM 26 stores a program to be executed by the CPU 23 and certain data necessary when executing the program. The RAM 27 serving as a work area temporarily stores a necessary program or data when the CPU 23 executes various processing.

With such a structure, the CPU 23 controls units constituting the image pickup apparatus by executing the program stored in the program ROM 26, and executes predetermined processing in response to a signal input from the touch panel 16 or a signal input from the operation unit 24. The operation unit 24 is operated by the user, and supplies, to the CPU 23, a signal in response to the user's operation.

If the touch panel 16 is pressed, for example, by a finger at an arbitrary position (that is, if a user performs an operation input), the touch panel 16 detects the coordinates of the pressed position, and sends a signal relating to the coordinates to the CPU 23. The CPU 23 obtains certain information regarding the coordinates, and executes certain processing on the basis of the obtained information.

When the subject-image light enters the image pickup device 12 via the lens unit 11, the image pickup device 12 picks up the subject-image light, converts the subject-image light into an analog image signal, and outputs the analog image signal. Here, the motor driver 21 drives the actuator 20 on the basis of the control performed by the CPU 23. This driving causes the lens unit 11 to be exposed to the outside or to be stored in the casing of the image pickup apparatus. This driving also causes the aperture of the lens unit 11 to be adjusted or the focus lens included in the lens unit 11 to be moved.

Furthermore, the TG 22 supplies a timing signal to the image pickup device 12 on the basis of the control performed by the CPU 23. This timing signal is used to control, for example, an exposure time for the image pickup device 12. The image pickup device 12 is operated on the basis of the timing signal supplied from the TG 22. This causes the image pickup device 12 to convert the received subject-image light entering via the lens unit 11 into an analog image signal, which is an electric signal whose amplitude varies in response to the amount of the light received, and supply the analog image signal to the analog signal processing unit 13. The analog signal processing unit 13 performs, on the basis of the control performed by the CPU 23, analog signal processing (for example, amplification) on the analog image signal supplied from the image pickup device 12, and supplies a resulting image signal to the A/D conversion unit 14.

The A/D conversion unit 14 converts, on the basis of the control performed by the CPU 23, the analog image signal supplied from the analog signal processing unit 13 into digital image data, and supplies the digital image data to the digital signal processing unit 15. The digital signal processing unit 15 performs digital signal processing such as noise reduction processing on the digital image data supplied from the A/D conversion unit 14, supplies the resulting digital image data to the liquid crystal panel 17, and causes an image represented by the resulting digital image data to be displayed on the liquid crystal panel 17 on the basis of the control performed by the CPU 23.

The digital signal processing unit 15 performs compression processing, for example, in accordance with the joint photographic experts group (JPEG) scheme, on the digital image data supplied from the A/D conversion unit 14, supplies the resulting compressed digital image data to the recording device 19, and causes the resulting compressed digital image data to be recorded in the recording device 19.

Moreover, the digital signal processing unit 15 performs decompression processing on the compressed image data recorded in the recording device 19, supplies the resulting image data to the liquid crystal panel 17, and causes an image represented by the resulting image data to be displayed on the liquid crystal panel 17. That is, the digital signal processing unit 15 supplies, to the liquid crystal panel 17, the image data supplied from the A/D conversion unit 14, and an image represented by the image data is displayed on the liquid crystal panel 17 as a so-called through-the-lens image. Furthermore, the digital signal processing unit 15 generates, on the basis of the control performed by the CPU 23, a focus frame (an autofocus (AF) frame) used to control the focus, supplies the focus frame to the liquid crystal panel 17, and causes the focus frame to be displayed on the liquid crystal panel 17.

Then, if a user presses a shutter button included in the operation unit 24, the operation unit 24 supplies a release signal to the CPU 23. If such a release signal is supplied to the CPU 23 in this way, the CPU 23 controls the digital signal processing unit 15, so that the image data supplied from the A/D conversion unit 14 to the digital signal processing unit 15 is compressed and the compressed image data is recorded in the recording device 19.

The image pickup apparatus has an AF function. In this embodiment of the present invention, the AF frame is set on an image picked up by the image pickup device 12, and the focus of the lens unit 11 is controlled on the basis of the image within the AF frame. This AF function allows the AF frame to be set at an arbitrary position on the image displayed on the liquid crystal panel 17. Moreover, for example, the position of and the size of the AF frame can be controlled by just operating the touch panel 16 integrally provided with the liquid crystal panel 17. The AF processing is achieved if the CPU 23 reads and executes a program stored in the program ROM 26. In addition this image pickup apparatus has an AE function and an AWB function. These functions can also be achieved if the CPU 23 reads and executes a program stored in the program ROM 26.

Here, a characteristic point will be described below. That is, the CPU 23 controls a timing of the start and end of image pickup in the smile mode. In this example, when a shutter button 24 included in the operation unit 24 is fully pressed, image pickup in the smile mode starts. When any one of conditions, for example, a maximum-number-of-shots limitation, a shutter button being fully pressed, and a time limitation, is satisfied, the image pickup (processing) in the smile mode ends. Each of these conditions may be prioritized, or other completion conditions may be further added, as a matter of course. Thus, in image pickup with smile detection of a subject, since the CPU 23 appropriately controls a timing of the start/end of the image pickup, this image pickup apparatus can be used to obtain a high-quality image.

Figure 4A:
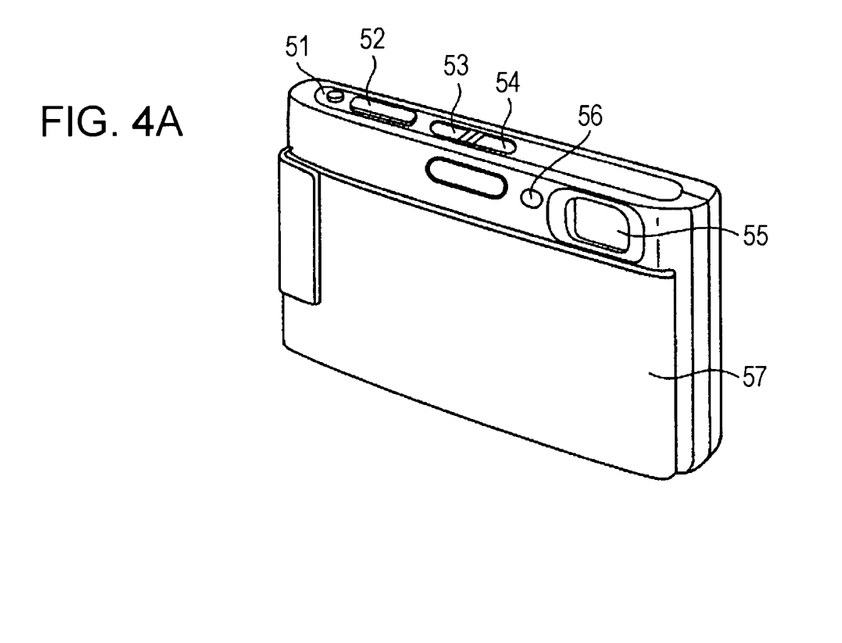
FIG. 4A is a front-side perspective view of the image pickup apparatus according to the second embodiment of the present invention.
Figure 4B:
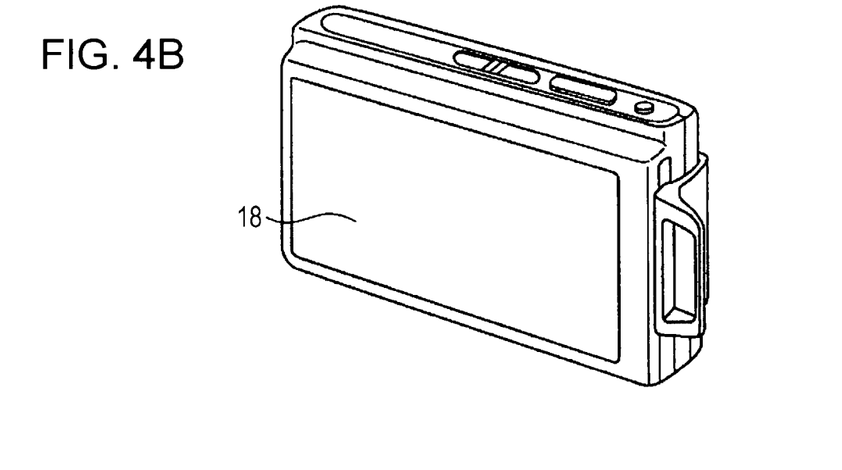
FIG. 4B is a back-side perspective view of the image pickup apparatus according to the second embodiment of the present invention.

FIGS. 4A and 4B show external views of an image pickup apparatus according to the second embodiment of the present invention.

FIG. 4A shows a front-side perspective view of the image pickup apparatus, and FIG. 4B shows a back-side perspective view of the image pickup apparatus.

A lens cover 57 is provided on the front side of the image pickup apparatus. A shooting lens 55, which is included in the lens unit 11, and an AF illuminator 56 are arranged to be exposed to the outside when the lens cover 57 is slid down. The AF illuminator 56 also functions as a self-timer lamp. A zoom lever (TELE/WIDE) 51, a shutter button 52, a playback button 53, and a power button 54 are provided on the top surface of the image pickup apparatus. The touch screen 18 is provided at the back side of the image pickup apparatus. The zoom lever 51, the shutter button 52, the playback button 53, and the power button 54 are included in the operation unit 24.

Figure 5:
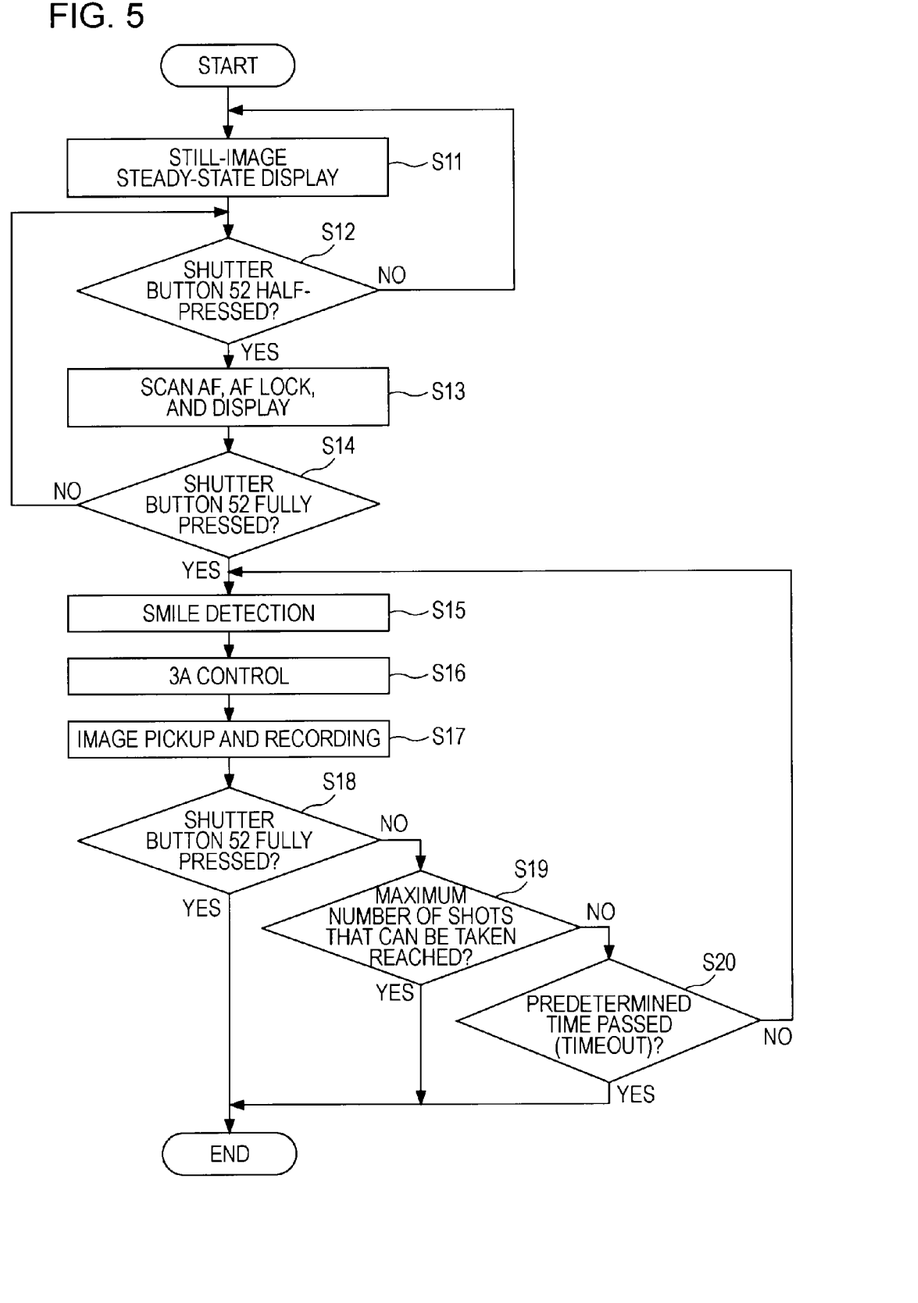
FIG. 5 is a flowchart of characteristic processing of the image pickup apparatus according to the second embodiment of the present invention.
Figure 6:
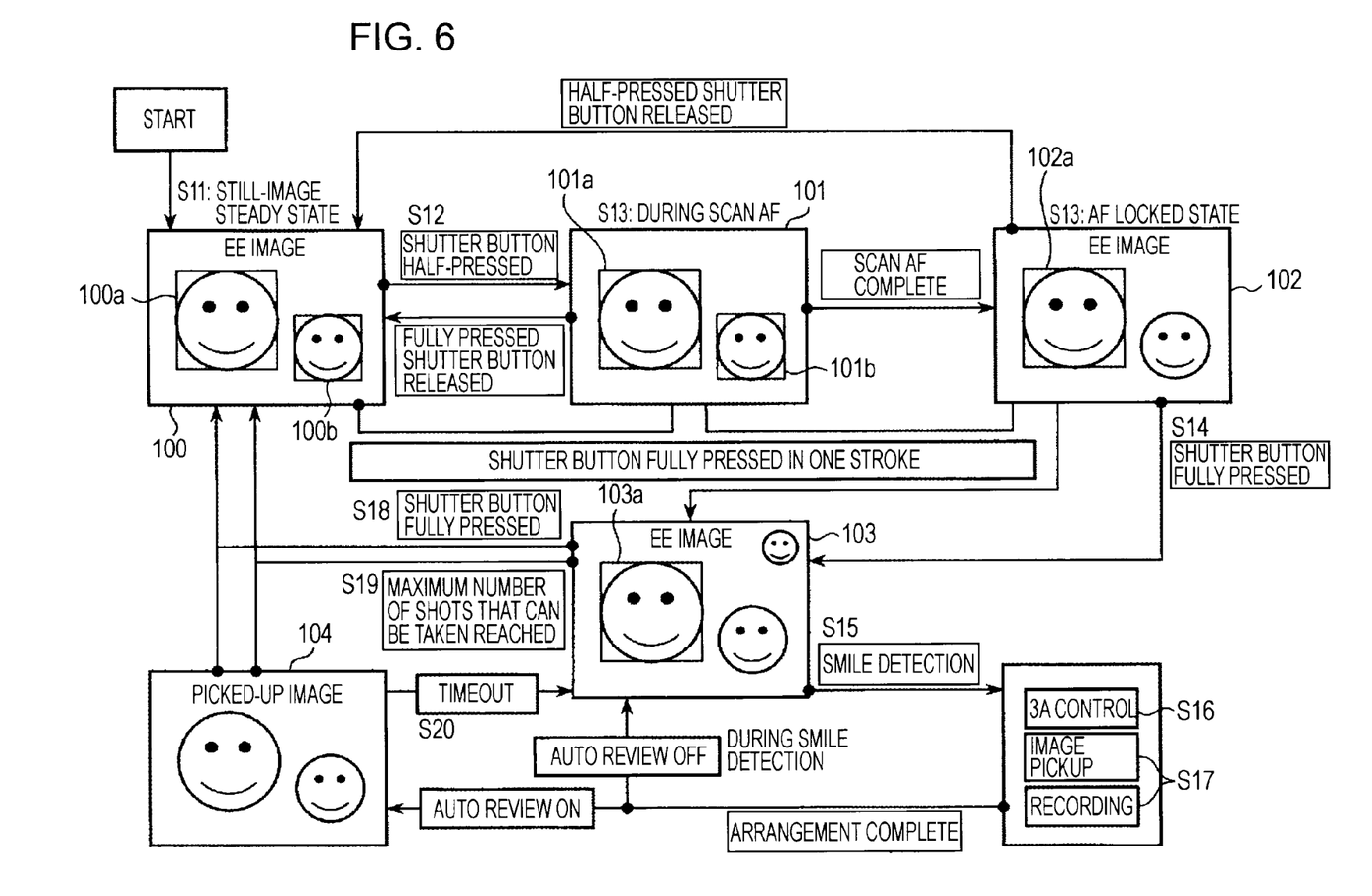
FIG. 6 is a schematic diagram, which includes screen transition, of the characteristic processing of the image pickup apparatus according to the second embodiment of the present invention.

Characteristic processing performed by the image pickup apparatus according to the second embodiment of the present invention will be described below in more detail with reference to a flowchart shown in FIG. 5. Reference will be made to FIG. 6 as necessary. A series of processing operations described below also corresponds to an image pickup control method according to the second embodiment.

In step S11, when a smile mode is set and processing starts, first, a still-image steady-state display is performed using the liquid crystal panel 17. This is shown as a screen 100 in FIG. 6. An AF frame 100*a* is displayed on the screen 100.

Next, in step S12, the CPU 23 detects whether a shutter button 52 included in the operation unit 24 is half-pressed. If the shutter button 52 is not half-pressed, the still-image steady-state display is continuously performed. If the shutter button 52 is half-pressed ("Yes" in step S12), in step S13, scan AF is executed, AF lock is performed, and this state is displayed on the liquid crystal panel 17. This is shown as screens 101 and 102 in FIG. 6. That is, during AF scanning, AF frames 101*a* and 101*b* are displayed as shown in the screen 101. When the AF scanning is finished and a state is switched to be in an AF lock state, an AF frame 102*a* which is locked is specified and displayed on the screen 102.

In step S14, the CPU 23 determines whether the shutter button 52 is fully pressed. If the shutter button 52 is determined not to be fully pressed ("No" in step S14), the flow returns to step S12, and the above-described processing is repeated. If the shutter button 52 is determined to be fully pressed, smile detection is executed in step S15. Here, as shown on a screen 103 in FIG. 6, an AF frame 103*a* surrounds a face which is a subject of smile detection. The face which is a subject of this smile detection was determined, for example, when AF lock was previously performed.

Here, smile detection is performed as a result of the CPU 23 reading out a program stored in the program ROM 26. For example, with respect to the face of the subject on which the AF frame has been set, that is, the face being AF locked, a noticeable part is specified. Whether the noticeable part satisfies a predetermined condition is determined. If the noticeable part satisfies the predetermined condition, it is determined that a smile is present on the face of the subject. Such a noticeable part includes, for example, the eyes or mouth of a subject, more particularly, the size (area) of the white of an eye, and/or a lateral length of the mouth and the size (area) of a white part. However, the noticeable part is not limited thereto.

In this way, in step S16, image pickup control is performed at a time when a smile is detected. Here, the image pickup control is 3A control, which includes AF, AE, and AWB. Afterwards, a subject image is picked up by the image pickup device 12 and converted into digital image data by the analog signal processing unit 13 and the A/D conversion unit 14. The digital signal processing unit 15 performs the above-described processing on the digital image data and the processed digital image data is recorded in the recording device 19 in step S17.

Although not shown in the flowchart, auto review can be performed here. In this case, if auto review is set to be "ON", an auto-review display is performed using the liquid crystal panel 17 as shown on a screen 104 in FIG. 6.

Next, in step S18, the CPU 23 determines whether the shutter button 52 is fully pressed. If the shutter button 52 is fully pressed ("Yes" in step S18), processing is completed. If it is determined that the shutter button 52 is not fully pressed ("No" in step S18), the CPU 23 determines whether a maximum number of shots that can be taken has been reached in step S19. If the CPU 23 determines that the maximum number of shots that can be taken has been reached ("Yes" in step S19), processing is completed.

If it is determined that the maximum number of shots that can be taken has not been reached ("No" in step S19), the CPU 23 determines whether a predetermined period of time has passed (timeout) in step S20. If it is determined that the predetermined period of time has passed ("Yes" in step S20), processing is completed. If the CPU 23 determines that the predetermined period of time has not been passed ("No" in step S20), the flow returns to step S15 and the above-described processing is repeated. That is, if any of these completion conditions is not satisfied, processing of smile detection, 3A control, and image pickup and recording is repeated.

Here, determination is performed in the order of whether the shutter button 52 is fully pressed, whether the maximum number of shots that can be taken has been reached, and whether the predetermined period of time has passed. However, the order is not limited thereto, and the completion conditions may be determined according to priorities assigned arbitrarily. Moreover, other completion conditions may be added.

If smiles are detected on a plurality of faces, the highest priority is assigned to the face of a subject selected by a user's operation performed through the touch panel 16. For the other faces, a high priority is assigned to a face near the selected face or a face positioned at a subject distance the same as the selected face. According to the priorities, AF frames can be set for a predetermined number of faces, as a matter of course. Moreover, if a user does not specifically select a face of a subject, priorities may be determined by assigning a high priority to a face near the center of a screen or a face the size of which is large. According to the priorities, AF frames can be set for a predetermined number of faces, as a matter of course.

As described above, according to the first and second embodiments, if a smile mode is set and image pickup with smile detection is executed, processing of smile detection, 3A control, and image pickup and recording is performed in synchronization with, for example, a shutter button being fully pressed until a completion condition is satisfied. When a completion condition such as a shutter button being fully pressed, a maximum number of shots that can be taken being reached, or a lapse of a predetermined period of time is satisfied, a timing of the start/end of image pickup is appropriately controlled so as to complete a series of processing operations. As a result, high-quality images can be obtained.

Embodiments of the present invention have been described; however, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, in a case in which AF frames have been set for a plurality of faces of subjects, if a plurality of images are picked up in a smile mode, images can be obtained, in each of which one of the subjects smiled, by successively picking up images at times when a smile is detected on one of the faces with the AF frames. Here, the AF frames may be prioritized and images may be picked up according to the priorities. Therefore, once image pickup is started in a smile mode, images can be obtained in each of which one of on-screen subjects smiled.

What is claimed is:

1. An image pickup apparatus comprising:
image pickup means for picking up a subject image; and
control means for performing control in a manner such that, in a case in which a predetermined mode is set, smile detection of a plurality of subjects is started when an operation input is performed, the subject image is picked up in response to a first smile of a first subject of the plurality of subjects being detected, independent of a total number of the plurality of subjects on which the smile detection is performed, and smile detection and image pickup are repeatedly performed until a completion condition is satisfied, wherein
each of at least two picked up subject images includes a different subject smiling.

2. The image pickup apparatus according to claim 1,
wherein the completion condition is the operation input.

3. The image pickup apparatus according to claim 1,
wherein the completion condition is reaching of a maximum number of shots that can be taken.

4. The image pickup apparatus according to claim 1,
wherein the completion condition is a lapse of a predetermined period of time from when the operation input is performed.

5. The image pickup apparatus according to claim 1,
wherein the control means performs image pickup control between the smile detection and the image pickup.

6. The image pickup apparatus according to claim 1, wherein the smile detection is performed based on a set priority order of each of the plurality of subjects.

7. The image pickup apparatus according to claim 1, wherein the smile detection is performed based on a priority order that is set according to a position of a face of each of the plurality of subjects.

8. An image pickup method comprising the steps of:
performing smile detection of a plurality of subjects when an operation input is performed in a case in which a predetermined mode is set;
picking up a subject image in response to a first smile of a first subject of the plurality of subjects being detected, independent of a total number of the plurality of subjects on which the smile detection is performed; and
repeating the step of performing smile detection and the step of picking up until a completion condition is satisfied, each of at least two picked up subject images including a different subject smiling.

9. The image pickup method according to claim 8, further comprising the step of performing image pickup control between the step of performing smile detection and the step of picking up.

10. The image pickup method according to claim 8,
wherein the completion condition is the operation input.

11. The image pickup method according to claim 8,
wherein the completion condition is reaching of a maximum number of shots that can be taken.

12. The image pickup method according to claim 8,
wherein the completion condition is a lapse of a predetermined period of time from when the operation input is performed.

13. A non-transitory computer-readable storage medium including computer executable instructions, wherein the instructions, when executed by a computer, cause the computer to perform an image pickup method, the image pickup method comprising the steps of:
performing smile detection of a plurality of subjects when an operation input is performed in a case in which a predetermined mode is set;
picking up a subject image in response to a first smile of a first subject of the plurality of subjects being detected, independent of a total number of the plurality of subjects on which the smile detection is performed; and
repeating the step of performing smile detection and the step of picking up until a completion condition is satisfied, each of at least two picked up subject images including a different subject smiling.

14. The non-transitory computer-readable storage medium according to claim 13,
further comprising the step of performing image pickup control between the step of performing smile detection and the step of picking up.

15. An image pickup apparatus comprising:
an image pickup unit configured to pick up a subject image; and
a control unit configured to perform control in a manner such that, in a case in which a predetermined mode is set, smile detection of a plurality of subjects is started when an operation input is performed, the subject image is picked up in response to a first smile of a first subject of the plurality of subjects being detected, independent of a total number of the plurality of subjects on which the smile detection is performed, and smile detection and image pickup are repeatedly performed until a completion condition is satisfied, wherein
each of at least two picked up subject images includes a different subject smiling.

16. The image pickup apparatus according to claim 15,
wherein the completion condition is the operation input.

17. The image pickup apparatus according to claim 15,
wherein the completion condition is reaching of a maximum number of shots that can be taken.

18. The image pickup apparatus according to claim 15,
wherein the completion condition is a lapse of a predetermined period of time from when the operation input is performed.

19. The image pickup apparatus according to claim 15,
wherein the control unit is further configured to perform image pickup control between the smile detection and the image pickup.

* * * * *